United States Patent [19]

Kuroda

[11] Patent Number: 5,813,322
[45] Date of Patent: Sep. 29, 1998

[54] DIE HEIGHT CORRECTING APPARATUS FOR PRESS

[75] Inventor: Yoshiaki Kuroda, Ishikawa-ken, Japan

[73] Assignees: Komatsu Ltd.; Komatsu Industries Corporation, both of Tokyo, Japan

[21] Appl. No.: 875,477
[22] PCT Filed: Jan. 25, 1996
[86] PCT No.: PCT/JP96/00137
§ 371 Date: Jul. 29, 1997
§ 102(e) Date: Jul. 29, 1997
[87] PCT Pub. No.: WO96/23653
PCT Pub. Date: Aug. 8, 1996

[30] Foreign Application Priority Data

Jan. 31, 1995 [JP] Japan ................................ 7-013415

[51] Int. Cl.$^6$ .............................. B30B 15/14; B30B 15/26
[52] U.S. Cl. ............................ 100/43; 72/21.1; 72/446; 100/48; 100/99; 100/231; 100/257
[58] Field of Search .................. 100/43, 48, 99, 100/231, 257; 72/17.1, 20.1, 21.1, 446; 83/530

[56] References Cited

U.S. PATENT DOCUMENTS 4,621,517  11/1986  Hatanaka et al. ..................... 72/17.2

FOREIGN PATENT DOCUMENTS

| 57-48448 | 3/1982 | Japan | 72/20.1 |
| 57-44415 | 9/1982 | Japan . | |
| 60-191700 | 9/1985 | Japan | 100/43 |
| 2-1599 | 1/1990 | Japan . | |
| 2-255298 | 10/1990 | Japan | 100/99 |
| 3-41916 | 9/1991 | Japan . | |
| 4-190921 | 7/1992 | Japan . | |
| 4-266498 | 9/1992 | Japan | 100/99 |
| 5-162000 | 6/1993 | Japan | 100/99 |

Primary Examiner—Stephen F. Gerrity
Attorney, Agent, or Firm—Fish & Richardson P.C.

[57] ABSTRACT

A die height correcting apparatus for a press having sides formed by C-shaped frames and a slide to be driven up and down being provided on an upper portion of a press body, includes an auxiliary frame provided on the side surface of at least one of the C-shaped frame. The lower end side of the auxiliary frame is pivotably mounted on the C-shaped frame and has a free end at the upper end side, a slide position detector provided on the upper end side of the auxiliary frame, and a temperature detector provided at least on the upper end side of the auxiliary frame among the upper end side of the auxiliary frame and the slide position detector. The slide is NC controlled on the basis of a slide position detected by the slide position detector, the temperature detector detects a temperature of the upper end side of the auxiliary frame among the upper end side of the auxiliary frame and the slide position detector. At least an expansion and contraction amount of the auxiliary frame among the expansion and contraction amount of the auxiliary frame and a temperature drift of the slide position detector are calculated on the basis of a temperature variation amount derived from comparison of the temperature detected by the temperature detector and a preliminarily set reference temperature to correct the command value of the NC control by adding and subtracting the calculated value to and from the command value.

6 Claims, 6 Drawing Sheets

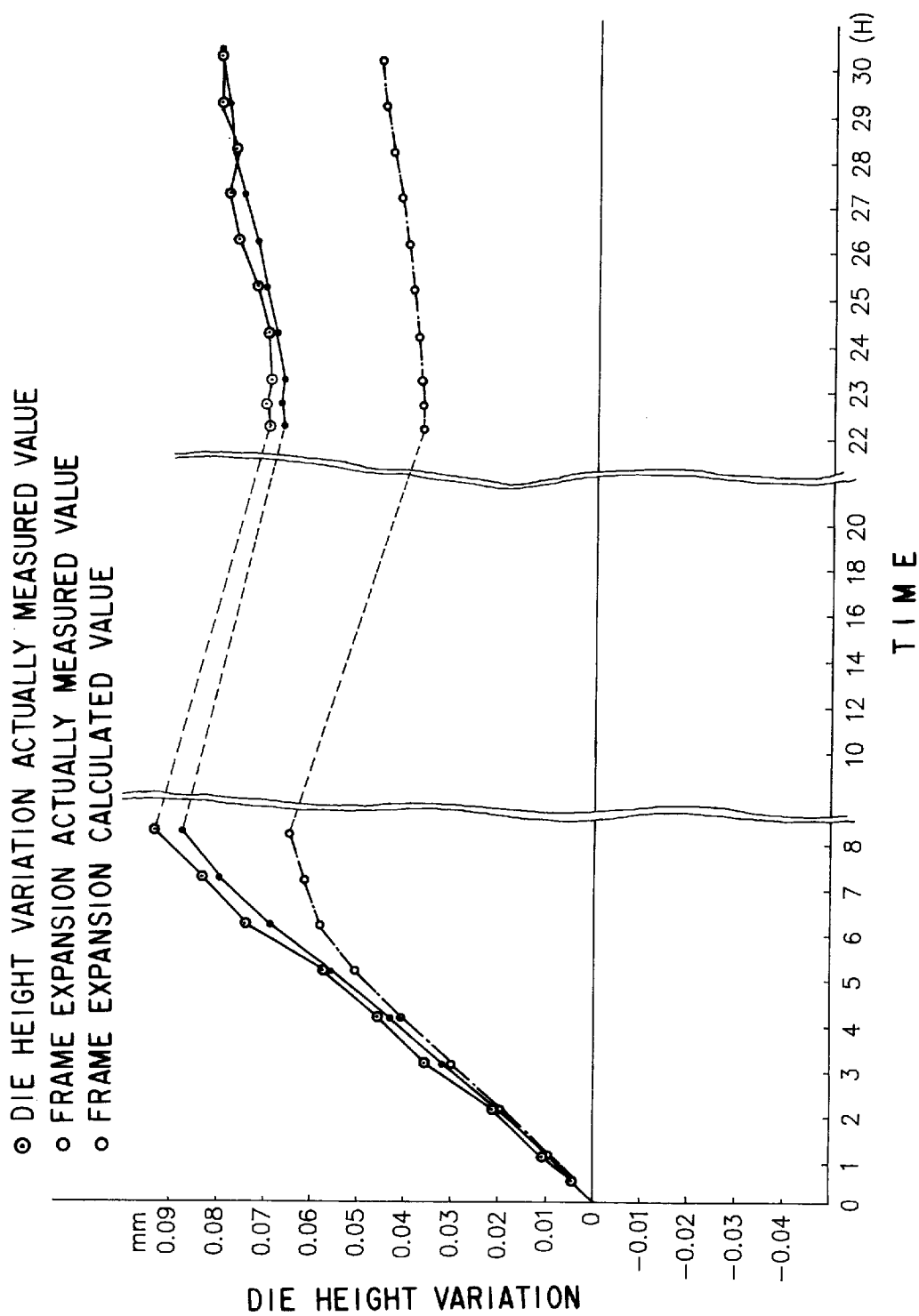

DIE HEIGHT CORRECTING APPARATUS FOR PRESS

TECHNICAL FIELD

The present invention relates to a die height correcting apparatus for a press which enables a high precision press process.

BACKGROUND

The conventional press machine has a slide (or a ram) mounted on a press body and vertically movable on the press body. The machine also includes a bolster (or head) fixed to the press body. The bolster is constructed to place a work between an upper die mounted on the slide and a lower die set on the bolster to perform press work by using the slide to lower the upper die toward the lower die.

In the press machine as set forth above, a distance (die height) from an upper surface of the bolster to a lower surface of the slide must be set to define a predetermined distance between the upper and lower dies each time that a die is changed. The die height must be adjusted with high precision when performing high precision press work.

However, even when the die height is adjusted with high precision before press work, the die height still may vary if so-called mouth opening, which results when the opening formed between the upper and lower jaws of the frame opens, is caused by deformation of a C-shape frame by press load during the press process. When mouth opening occurs and, for example, a coining process is performed, the coining amount may become insufficient, so as to produce a defective product, or the coining amount may become excessive, which damages the die or causes quick wearing.

Therefore, the prior art has proposed various ways to avoid influence on working accuracy when mouth opening is caused in the C-shape frame.

For example, in Japanese Examined Patent Publication (Kokoku) No. Showa 57-44415, there is proposed a stroke adjusting apparatus for a press brake, in which a portal guarder is fixed between frames at a position not influenced by an expansion during the working process. A pair of lower limit stroke control valves are arranged on the portal guarder. Right above these control valves, an actuation mechanism is provided to push valve rods of the control valves to stop an up/down cylinder when the ram is lowered.

Alternatively, in Japanese Examined Utility Model Publication No. Heisei 3-41916, there is proposed a ram guide adjusting apparatus for a press machine, in which sensors for detecting deformation of ram guide in the back-and-forth direction are provided on left and right support frames provided in the vicinity of both C-shaped side frames. By adjusting the ram guide in the back-and-forth direction on the basis of a value detected by the sensors, more precise press work can be performed.

In addition, variation of the die height in the press is caused not only by the occurrence of deformation of the frame due to press load but also by thermal expansion or contraction influenced by temperature variation during press work.

Therefore, there have been proposed various ways to avoid influence of temperature variation on the die height.

For example, Japanese Unexamined Utility Model Publication (Kokai) No. Heisei 2-1599 discloses a temperature sensor that detects a temperature of a press machine. A bottom dead center position correcting apparatus preliminarily stores variation amount of the bottom dead center of the slide corresponding to the temperature of the press machine. The apparatus performs calculation of a correction amount of the bottom dead center position corresponding to a temperature signal from the temperature sensor to control driving of the driving motor on the basis of the result of calculation.

Japanese Unexamined Patent Publication No. Heisei 4-190921 discloses an edge distance correcting apparatus which detects thermal displacements of the frame, upper and lower tables, and upper and lower dies caused by respective temperature variation thereof to perform a correction process for correcting the edge distance between the upper die and the lower die to a preliminarily set value on the basis of respective detection values.

However, the foregoing stroke adjusting apparatus or the foregoing ram guide adjusting apparatus, which enable a high precision process even when a deformation of the frame is caused by the press load, encounter a problem in that they may not be effective for the variation of the die height which is caused by thermal deformation of the frame.

Even for systems provided with the support bracket separately to the frame, the foregoing problem is inherently caused in the case where die height variation is due to thermal deformation of the support bracket.

In the apparatus detecting the temperature of respective portions to correct the bottom dead center position on the basis of the detection values or to correct the edge distance between the upper and lower dies to the preliminarily set value, the following problems may be encountered. Namely, since the frame is not simple shape, a complicated thermal deformation of the frame may result. Therefore, in the foregoing bottom dead center correcting apparatus or the correcting apparatus for edge distance between the upper and lower dies, even when the temperature at the measuring point is the same, thermal deformation amount of the frame and so forth is not necessarily the same when operation hysteresis or processing condition are differentiated. Therefore, the correction error is caused.

Normally, the position sensor should have a temperature drift such that its output value varies with variation of the environmental temperature in use or self-heating. Therefore, even when control is effected on the basis of the detected value of the position sensor, a high precision process is not possible.

The present invention reduces shortcomings of the prior art. Therefore, it is an object of the present invention to provide a die height correcting apparatus for a press, with the apparatus enabling a high precision process by minimizing the influence of heat.

SUMMARY

According to one aspect of the present invention, a die height correcting apparatus is provided for a press in which both sides are formed by C-shaped frames and a slide to be driven up and down is provided on an upper portion of a press body. The apparatus includes an auxiliary frame provided on the side surface of at least one of the C-shaped frames. The auxiliary frame includes a lower end side pivotably connected to the C-shaped frame and a free end at the upper end side. Slide position detecting means are provided on the upper end side of the auxiliary frame, and temperature detecting means are provided at least on the upper end side of the auxiliary frame among the upper end side of the auxiliary frame and the slide position detecting means.

The slide is NC controlled on the basis of a slide position detected by the slide position detecting means. A temperature of at least the upper end side of the auxiliary frame among the upper end side of the auxiliary frame and the slide position detecting means, as detected by the temperature detecting means; and at least an expansion and contraction amount of the auxiliary frame among the expansion and contraction amount of the auxiliary frame and a temperature drift of the slide position detecting means being calculated on the basis of a temperature variation amount derived from comparison of the temperature detected by the temperature detecting means and a preliminarily set reference temperature to correct the command value of the NC control by adding and subtracting the calculated value to and from the command value.

It is preferred that temperature detecting means is provided on the slide position detecting means, a temperature drift of the slide position detecting means is calculated on the basis of a temperature variation amount derived from comparison of the temperature of the slide position detecting means detected by the temperature detecting means and a preliminarily set reference temperature, and the obtained value is also added to or subtracted from the command value of the NC control.

With the construction set forth above, even when deformation of the press body is caused due to variation of atmospheric temperature or temperature of the press body during press work, the command value is corrected depending upon the expansion and contraction amount of the auxiliary frame and the temperature drift of the slide position detecting means derived on the basis of the temperature detected by the temperature detecting means. The slide is NC controlled by the corrected command value to permit high precision press work without being influenced by temperature.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

FIG. 6 is a diagrammatic illustration showing variation of a die height due to thermal deformation of a press body.

DETAILED DESCRIPTION

The preferred embodiment of a die height correcting apparatus for a press according to the present invention will be discussed hereinafter with reference to the accompanying drawings.

One embodiment of the present invention will be discussed in detail with reference to the drawings.

Figure 1:
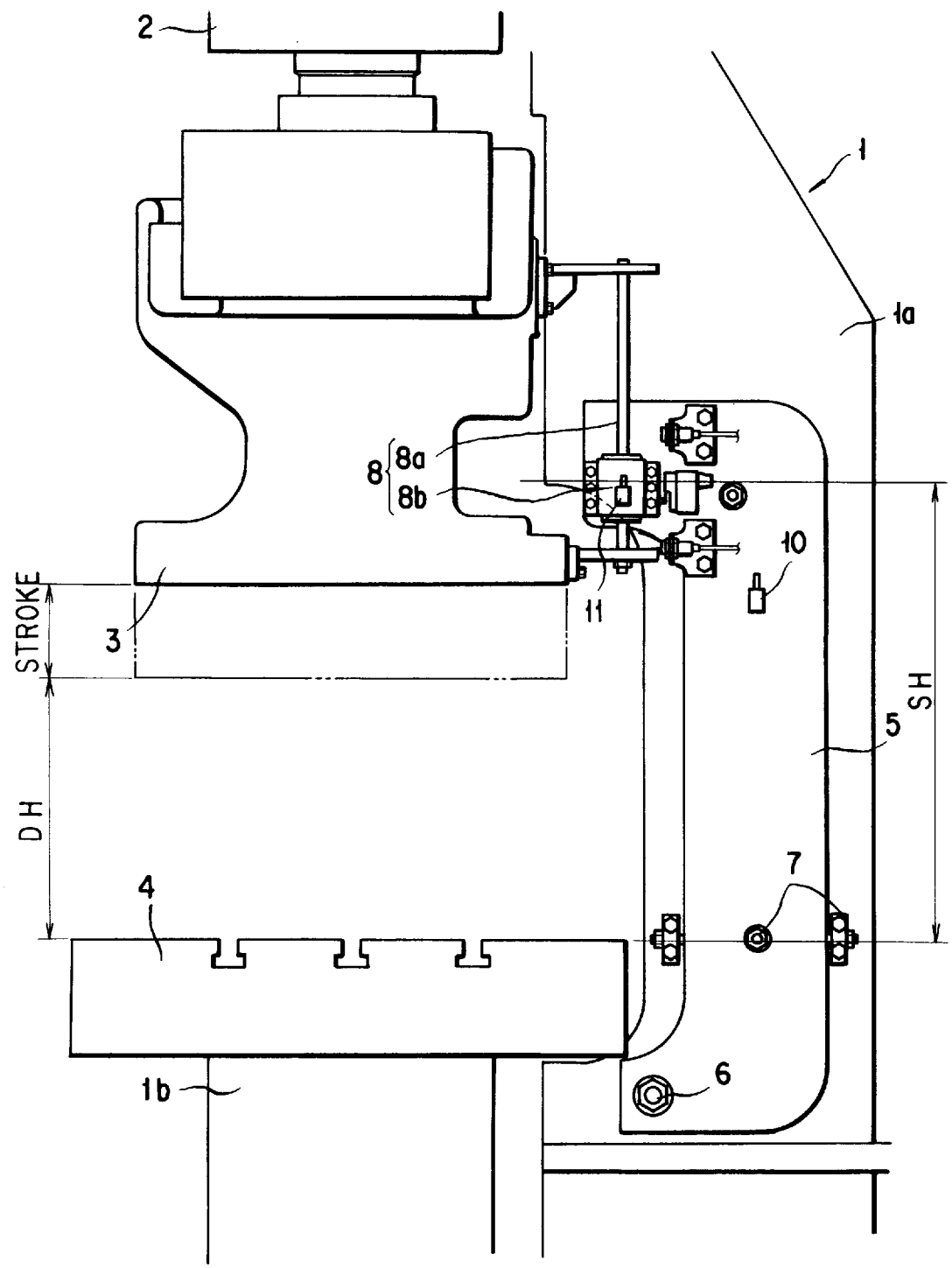
FIG. 1 is a side elevation of one embodiment of a die height correcting apparatus for a press.

In FIG. 1, the reference numeral 1 denotes a press body, both side portions of which are formed with C-shaped frames 1a and 1b. On the upper portion of the press body 1, a slide driving means 2, such as a hydraulic cylinder, is provided. By the slide driving means 2, a slide 3 is driven to move vertically. On the lower surface of the slide 3, an upper die (not shown) is mounted.

A lower die (not shown) is provided on a bolster 4 provided on a bed 1b forming a lower portion of the press body 1. By arranging a work between the upper die and the lower die, press work is performed by lowering the upper die by the slide 3.

An auxiliary frame 5 having substantially the same shape as the opening portion is provided in the vicinity of opening portion of the C-shaped frame 1a forming the press body 1.

The lower end portion of the auxiliary frame 5 is pivotably mounted on the side surface of the C-shaped frame 1a by a pin 6, and is held in substantially up-right condition by a falling preventing means 7. Between the upper end portion of the auxiliary frame 5 and the rear portion of the slide 3, a slide position detecting means 8 including a linear sensor is provided.

The slide position detecting means 8 is constructed with a sensor rod 8a supported on the rear portion of the slide 3 and extending along the moving direction of the slide 3, and a sensor head 8b fixed to the upper end portion of the auxiliary frame 5 through which the sensor rod 8a is extended. When the sensor rod 8a is moved vertically together with the slide 3, the position of the slide 3 is detected by detecting the position of the sensor rod 8a by the sensor head 8b.

A position signal output from the slide position detecting means 8 is taken in an NC apparatus so that NC control of the slide driving means is performed on the basis of the position signal.

On the upper portion of the straight position of the auxiliary frame 5, a temperature detecting means 10 constituted of a thermo sensor is provided. On the upper portion of the sensor head 8b, another temperature detecting means 11 constituted of the thermo sensor is provided.

The temperatures detected by the temperature detecting means 10 and 11 are compared with a preliminarily set reference temperature by the NC apparatus for deriving a difference therebetween. On the basis of the derived temperature difference, an expansion or contraction amount of the auxiliary frame 5 and drift amount due to temperature of the slide position detecting means 8 are calculated. The result of these calculations are fed back to the NC control means to correct the NC control value by the result of calculation.

A distance from the upper surface of the bolster 4 to the lower surface of the slide 3, namely a variation amount $\Delta DH$ of a die height DH, must be detected when the upper and lower dies are mounted on the slide 3 and the bolster 4. This distance is difficult to detect directly.

The variation amount $\Delta DH$ of the die height DH is equal to a variation amount $\Delta SH$ of a distance SH up to the sensor head 8b of the slide position detecting means 8 from the upper surface of the bolster 4. However, the drift amount due to temperature of the slide position detecting means 8 appears as an error.

Therefore, since the variation amount $\Delta SH$ of the distance SH to the sensor head is determined by thermal expansion, a temperature variation $\Delta T$ of the auxiliary frame 5 is measured by the temperature detecting means 10 and converted into $\Delta SH$. The temperature drift $\Delta HH$ of the sensor head 8b is converted from the temperature variation $\Delta t$ detected by the temperature detecting means 11. Then, a total drift ΔDD (=ΔSH+ΔHH) is fed back to the NC control means to offset (correct) ΔDD.

Figure 2:
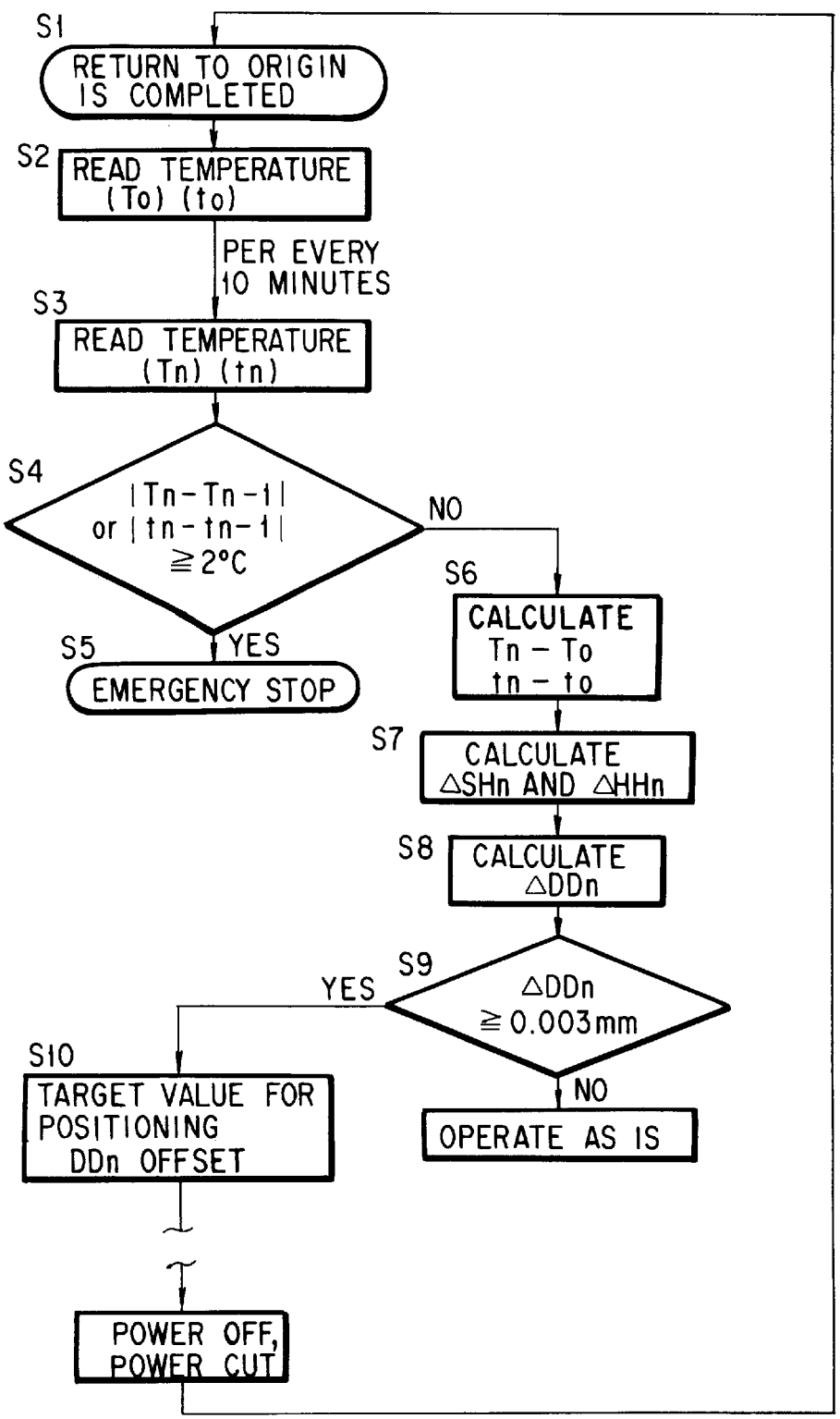
FIG. 2 is a flowchart showing an operation of the foregoing embodiment.

An actual correction method on the basis of the foregoing principle will be discussed with reference to the flowchart shown in FIG. 2. At first, at step S1, when a returning of the sensor head 8b to a relative origin with respect to the sensor rod is completed, temperatures (T0) and ($t_o$) of the auxiliary frame 5 are read by the temperature detecting means 10 and 11 at step S2. Subsequently, repeating up to step S3, temperatures (Tn) and (tn) are read at an interval of 10 minutes, for example, for n times.

Then, process is advanced to step S4, the judgment |Tn−T(n−1)| or |tn−t(n−1)|≧2° C. is performed, if "YES", it is a judgment that an abrupt rising or lowering of temperature is caused to be judged as abnormal. Then, the process is advanced to step S5 to effect emergency stop for the press.

On the other hand, if "NO", it is a judgment that no abnormality is caused to make the process advance to the step 6 to calculate Tn−T0 and tn−t0, then at step S7, ΔSHn and ΔHHn are calculated. Also, at step S8, ΔDDn is calculated.

The equation for calculating ΔDDn is as follow:

$$\Delta DDN = \Delta SHn + \Delta HHn$$

where ΔSHn is a thermal expansion of the auxiliary frame, and ΔHHn is a temperature drift of the slide position detecting means, 8, which are expressed as follows:
(1) Thermal Expansion of Auxiliary Frame 5

$$\Delta HN = 11 \times 10^{-6} \times L \ (Tn-T0) \ (mm)$$

where $11 \times 10^{-6}$ is a linear expansion coefficient, and L is a distance (mm) from the upper surface of the bolster 4 to the sensor head 8b.
(2) Temperature Drift of Slide Position Detecting Means 8

$$\Delta HHN = [-0.0034 + 16 \times 10^{-6} \times ST] \cdot (tn-t0) \ (mm)$$

where ST is a stroke of relative movement of the sensor head 8b relative to the sensor rod 8a.

Accordingly, from the foregoing (1) and (2), ΔDDn is obtained as:

$$\Delta DDN = [-0.0034 + 16 \times 10^{-6} \times ST] \cdot (tn-t0) + 11 \times 10^{-6} \times L \ (Tn-T0) \ (mm)$$

The NC control value can be corrected at step S10 by feeding back the total drift (correction value) derived from the foregoing equation to add to a bottom dead center position command value of the NC control.

It should be noted that the foregoing calculation is the case where the detection data of the sensor head 8b increases according to upward movement. If the sensor head 8b is mounted so that the detection data is increased according to downward movement, the sign of respective elements should be reversed. Namely, ΔHHn becomes −ΔHHn.

The foregoing calculation represents an algorithm where the temperature is measured at two points. However, when it is confirmed that tn and Tn are substantially equal to each other through a preliminary test, tn=Tn can be established to reduce the temperature measuring point to one point.

Figure 3:
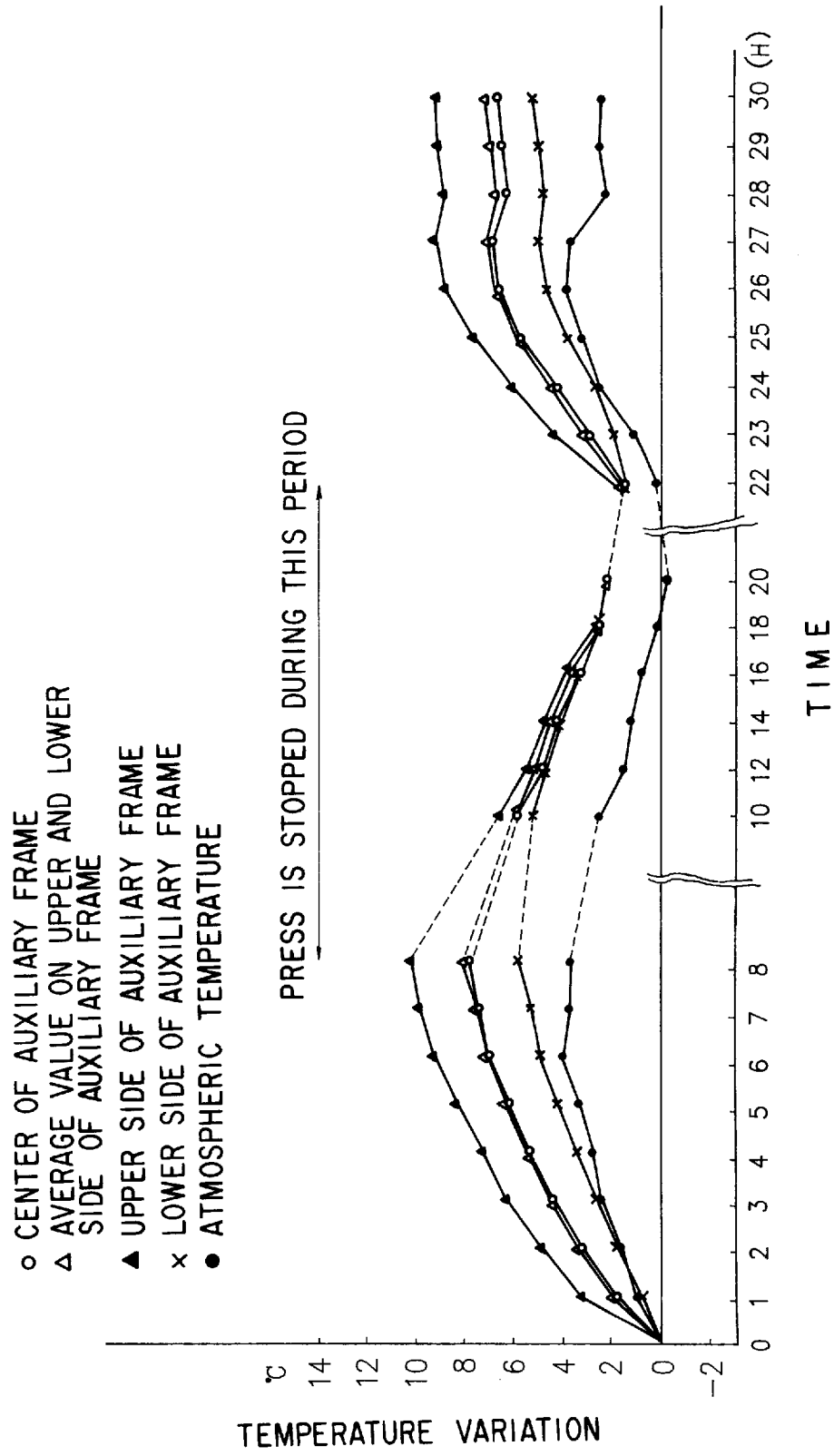
FIG. 3 is a diagrammatic illustration showing temperature variation of a correction frame provided in the foregoing embodiment.
Figure 4:
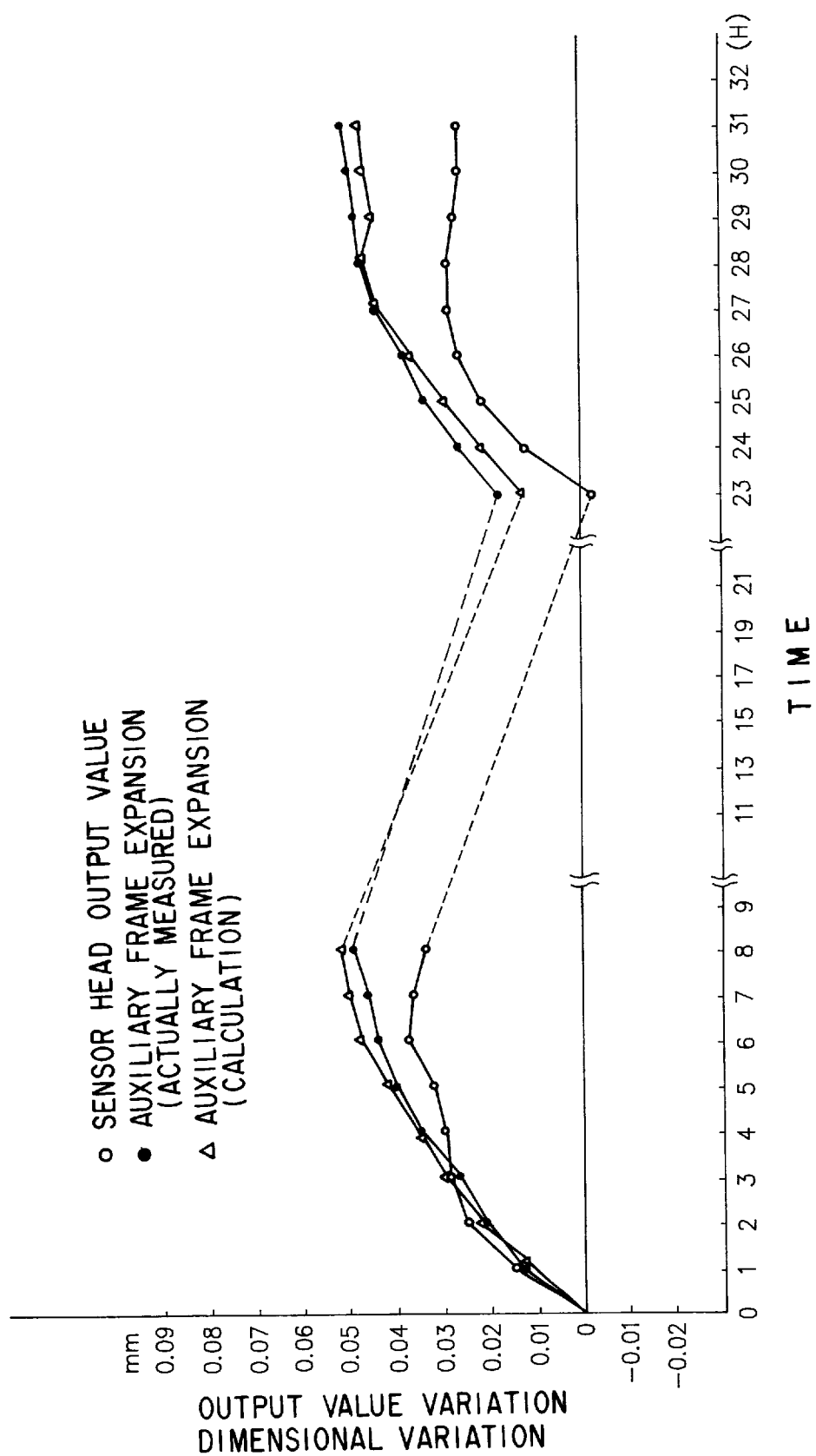
FIG. 4 is a diagrammatic illustration showing dimensional variation of an auxiliary frame of the foregoing embodiment and variation of output of a slide position detecting means.
Figure 5:
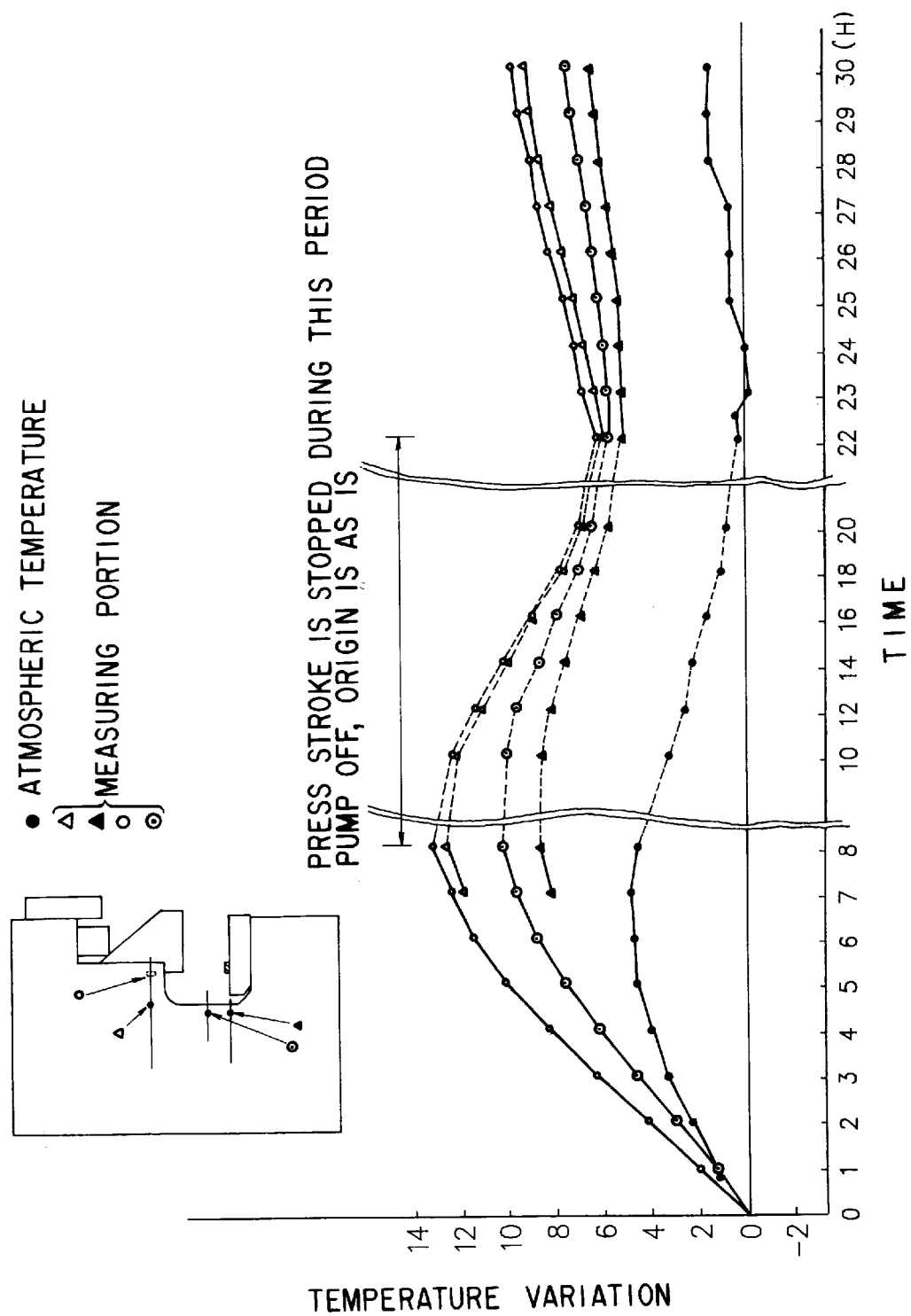
FIG. 5 is a diagrammatic illustration showing a temperature variation of the C-shaped frame of the press body.

Also, in FIGS. 3 and 4, a temperature variation of the auxiliary frame 5 and a variation of the output value of the slide position detecting means 8 due to a dimensional variation of the auxiliary frame 5, are shown respectively. According to FIG. 4, it is clear that an error of the calculated value of expansion of the auxiliary frame versus an actually measured value is quite small.

FIG. 6 compares a temperature variation and a variation of the die height of the C-shaped frame 1a when the temperature is detected by mounting the temperature detecting means 10 directly provided on the C-shaped frame 1a, According to FIG. 6, it is clear that an error of the calculated value of expansion of the frame versus the actually measured value is quite large.

It should be noted that while the shown embodiment performs correction of the temperature drift of the slide position detecting means 8, such correction may be unnecessary when the position detecting means having no or quite small temperature drift. Also, the correction is unnecessary when the temperature of the slide position detecting means 8 can be maintained constant by providing a heat sink or so forth.

While the auxiliary frame is shown as being of plate form, it can be of pipe shape, round bar shape, or polygon bar shape having a relatively simple shape having no hysteresis in thermal expansion and contraction amount in up and down cycles of the temperature.

Also, while the auxiliary frame 5 is provided on the side surface of one of the C-shaped frames 1a, it may be possible to provide respectively a pair of the auxiliary frames on left and right frames when the slide is large, or in the alternative, one auxiliary frame may be provided at the center portion of the slide 3. Furthermore, the precision can be further improved by effecting correction while also detecting the temperatures of the slide 3 and the bolster 4.

As set forth in detail, according to the present invention, the temperature of the auxiliary frame supporting the slide position detecting means and the temperature of the slide position detecting means are detected by the temperature detecting means, the expansion amount of the auxiliary frame and the temperature drift of the slide position detecting means are calculated, and the command value of the NC control apparatus controlling up/down movement of the slide is corrected by adding or subtracting the calculated value. With this approach, the die height will not be varied even when the atmospheric temperature or temperature of the press body is varied during press work. Therefore, high precision press work becomes possible.

Furthermore, by providing the slide position detecting means and the temperature detecting means on the auxiliary frame, they will not be influenced by vibration to be caused in the press body during press work. Therefore, reliability and durability of the detecting means can be improved. Also, fluctuation in output due to vibration can be successfully avoided.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

I claim:

1. A die height correcting apparatus for a press having a press body with sides formed by C-shaped frames and a slide positioned on an upper portion of the press body, the apparatus comprising:
   an auxiliary frame provided on a side surface of at least one of the C-shaped frames, the auxiliary frame being pivotably mounted at a lower end to the C-shaped frame and having a free upper end;

a slide position detecting means positioned on said upper end of said auxiliary frame;

a temperature detecting means positioned on said upper end of said auxiliary frame; and a controller for controlling the slide based on a slide position detected by said slide position detecting means;

wherein:

said temperature detecting means detects a temperature of said upper end of said auxiliary frame, said controller calculates an expansion amount of said auxiliary frame and a temperature drift of said slide position detecting means based on a temperature variation amount derived from comparison of the temperature detected by said temperature detecting means and a preliminarily set reference temperature; and said controller corrects the slide position based on the calculated expansion amount and temperature variation amount.

2. A die height correcting apparatus for a press as set forth in claim 1, wherein said temperature detecting means is positioned on said slide position detecting means.

3. A die height correction apparatus for a press as set forth in claim 1 or 2, wherein said auxiliary frame is provided in the vicinity of an opening portion of the C-shaped frame.

4. A die height correction apparatus for a press as set forth in claim 3, wherein said auxiliary frame has a substantially constant sectional shape over an entire length of the auxiliary frame.

5. A die height correction apparatus for a press as set forth in claim 2, wherein said auxiliary frame has a substantially constant sectional shape over an entire length of the auxiliary frame.

6. A die height correction apparatus for a press as set forth in claim 1, wherein said auxiliary frame has a substantially constant sectional shape over an entire length of the auxiliary frame.

* * * * *